May 19, 1925.
G. L. GRIER
MEDICAMENT INJECTING TUBE
Filed June 23, 1921
1,538,797
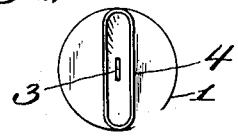
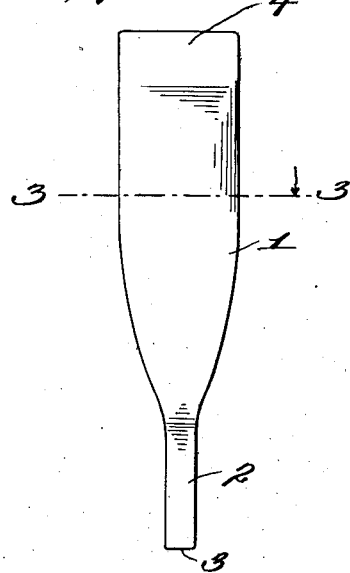
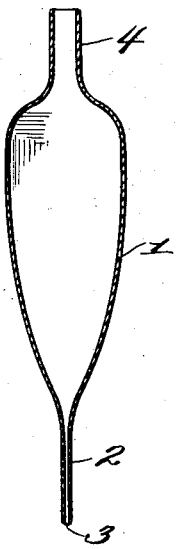
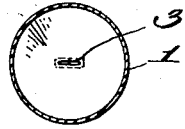
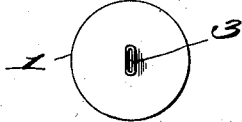
Inventor
Garrett L. Grier
By
Attorney Patented May 19, 1925.

1,538,797

UNITED STATES PATENT OFFICE.

GARRETT LAYTON GRIER, OF MILFORD, DELAWARE, ASSIGNOR TO THE L. D. CAULK COMPANY, OF MILFORD, DELAWARE, A CORPORATION OF DELAWARE.

MEDICAMENT-INJECTING TUBE.

Application filed June 23, 1921. Serial No. 479,828.

*To all whom it may concern:*

Be it known that I, GARRETT L. GRIER, a citizen of the United States, residing at Milford, in the county of Kent and State of Delaware, have invented new and useful Improvements in Medicament-Injecting Tubes, of which the following is a specification.

The present invention relates to improvements in collapsible tubes for dental uses and it provides a novel and improved tube which is particularly adapted for use for the injection of a medicament into the root sockets of teeth of patients suffering from pyorrhea or other infected condition of the root socket. Heretofore it has been the general practice of dentists in treating the root sockets of teeth affected with pyorrhea to inject a medicament into the tooth socket by the use of a dental syringe, the metal needle of which would be introduced into the root socket along the wall of the root. Such an operation, however, is usually very painful to the patient, owing to the irritation produced by the engagement of the metal needle of the syringe with the inflamed tissues of the gum or root sockets. This invention provides a medicament injecting tube which is composed of celluloid or similar insoluble collapsible and non-metallic substance which is of a nature which will enable a nipple or reduced discharge end thereon to be inserted between the root of the tooth and the wall of the root socket with a minimum irritation of the inflamed tissue, and hence with substantially no discomfort to the patient, the nipple or discharge end of the tube being flattened in cross section so that it may enter between the root of the tooth and the adjacent end of the root socket and with a minimum distention of the wall of the socket, the opposite end of the tube being flattened on the same diameter to enable the dentist to insert the flattened nipple or discharge end of the tube, so that its flattened side, the position of which will be indicated by the position of the opposite flattened end of the tube, will lie against the wall of the root and also to enable the dentist to squeeze the body of the tube which contains the medicament, between the fingers, and to thus inject the medicament into the root socket, without causing rotation of the tube or other deflection thereof that would tend to disturb the position of the flattened nipple or discharge end of the tube.

The accompanying drawings show a collapsible medicament injecting tube constructed in accordance with the preferred embodiment of the invention.

In the drawings:—

Figure 1 is a side view of the tube;

Figure 2 is a vertical sectional view of the tube as viewed at a right angle to its position as shown in Figure 1;

Figure 3 represents a cross section through the body of the tube on the line 3—3 of Figure 1;

Figure 4 represents an end view of the tube as viewed from its upper or larger end; and Figures 5 is an end view of the nipple or discharge end of the tube.

The collapsible medicament injecting tube is composed preferably of celluloid or of a similar collapsible non-metallic and insoluble substance. It comprises a tubular body portion 1 adapted to contain the medicament and a reduced stem or neck 2, the lower end 3 of which is open for the discharge of the medicament as induced by pressure applied to the sides of the body 1 to cause collapsing thereof. The end of the stem or nipple 2 adjacent to the discharge opening 3 is flattened, as shown, and the opposite end of the tube adjacent to the body portion thereof, and which is normally open to enable the medicament to be readily introduced into the tube, is similarly flattened on the same diameter on which the neck or nipple 2 is flattened, as is indicated at 4.

In using a medicament injecting tube made in accordance with the present invention, the medicament is introduced into the body portion 1 thereof and the flattened portion 4 of the tube is gripped between the thumb and finger of the operator. With the tube held in this way, the flattened nipple or injecting end 3 of the tube is introduced between the root of the tooth and the adjacent wall of its socket, so that a flat side of the flattened nipple or stem 2 will lie flatwise against the root, thus enabling the nipple or stem to be inserted without necessitating a substantial distention of the wall of the root socket. The operator is guided in the operation of inserting the flattened nipple or stem by the flattened portion 4 of the tube, the position of this flattened portion 4 of the tube indicating the plane in which the flattened portion of the nipple or stem lies. When the nipple or stem has been properly inserted into the root socket, compression is exerted by the thumb and finger on opposite sides of the main body portion 1 of the tube, and upon the flattened portion 4 thereof, in consequence of which the upper end of the tube will be squeezed until it is closed and the medicament will be forced out through the nipple or stem 2 and into the root socket.

Medicament injecting tubes embodying the present invention will enable medicament to be introduced into the root sockets of teeth with facility and with a minimum discomfort to the patient, and as these tubes are inexpensive, a fresh tube may be used for each patient. By constructing the tubes of celluloid or similar material which is insoluble, the tubes will not be dissolved or otherwise attacked by the medicament used, and hence any medicament suitable for the treatment required may be employed. Also, the flattened celluloid discharge end of the nipple will possess a degree of resilience or elasticity that will enable it to be introduced into pockets that may exist in the tooth root substantially without irritation to the inflamed and sensitive portions of the gum as the end of the nipple will yield more or less and thus accommodate itself to the walls of the space into which it is inserted. The celluloid or material composing the tube is preferably transparent or substantially so, in order that the amount of the medicament contained therein may be readily seen. Celluloid also possesses the advantages that it is non-hygroscopic so that the degree of pliability or elasticity possessed by tubes made of celluloid will remain constant or substantially so, notwithstanding variations in the degree of moisture to which the tubes may be subjected, and the insolubility of celluloid enables tubes made therefrom to resist medicaments of different kinds and also the moisture in the mouth of the patient. By constructing the tubes with normally flattened upper ends, the width of the upper end of each tube will be greater, on one diameter, than on the other diameter and hence the tubes will not roll and thus become displaced, when placed on a table or other flat surface.

I claim as my invention:—

1. A medicament-injecting tube for dental uses composed of elastic material and comprising a tubular collapsible body having a reduced nipple which is flattened on one diameter adjacent to its discharge end, the opposite end of the body being normally open and also flattened on the same diameter on which the nipple is flattened.

2. A medicament-injecting tube for dental uses composed of an insoluble elastic non-metallic non-hygroscopic substance and comprising a tubular collapsible body having a reduced medicament-injecting nipple projecting from one end thereof, said nipple adjacent to its discharge end and also the opposite end of the body being normally flattened on the same diameter whereby both such flattened portions lie in a common plane.

3. A medicament-injecting tube for dental uses comprising a collapsible tubular body composed of an insoluble non-metallic elastic substance having a normally-open flattened collapsible mouth at one end and a reduced medicament-injecting nipple at its other end.

4. A medicament-injecting tube for dental uses comprising a collapsible tubular body composed of an insoluble non-metallic elastic substance and having a normally open flattened collapsible mouth at one end and a reduced medicament-injecting nipple which is flattened at its discharge end in the same plane in which the mouth is flattened.

In testimony whereof I have hereunto set my hand in presence of two subscribing witnesses.

GARRETT LAYTON GRIER.

Witnesses:
 WM. C. SMITH,
 PAUL POETSCHKE.